United States Patent
Winter et al.

[11] Patent Number: 5,239,022
[45] Date of Patent: Aug. 24, 1993

[54] PROCESS FOR THE PREPARATION OF A SYNDIOTACTIC POLYOLEFIN

[75] Inventors: Andreas Winter, Glashütten; Martin Antberg, Hofheim am Taunus; Walter Spaleck; Jürgen Rohrmann, both of Liederbach; Volker Dolle, Kelkheim, all of Fed. Rep. of Germany

[73] Assignee: hoechst Aktiengesellschaft, Frankfurt, Fed. Rep. of Germany

[21] Appl. No.: 962,032

[22] Filed: Oct. 15, 1992

Related U.S. Application Data

[63] Continuation of Ser. No. 789,733, Nov. 8, 1991.

[30] Foreign Application Priority Data

Nov. 12, 1990 [DE] Fed. Rep. of Germany ....... 4035885

[51] Int. Cl.$^5$ .................................. C08F 4/44
[52] U.S. Cl. .................... 526/127; 526/160; 526/351; 502/152
[58] Field of Search ................. 526/127, 160

[56] References Cited

U.S. PATENT DOCUMENTS

| | | |
|---|---|---|
| 4,522,982 | 6/1985 | Ewen . |
| 4,769,510 | 9/1988 | Kaminsky et al. . |
| 4,871,705 | 10/1989 | Hoel .................. 526/160 |
| 5,081,322 | 1/1992 | Winter et al. ............ 585/9 |

FOREIGN PATENT DOCUMENTS

| | | |
|---|---|---|
| 88-20435 | 1/1989 | Australia . |
| 0384264 | 8/1990 | European Pat. Off. . |
| 3726067 | 2/1989 | Fed. Rep. of Germany . |
| 3826075 | 2/1990 | Fed. Rep. of Germany . |

Primary Examiner—Joseph L. Schofer
Assistant Examiner—David Wu
Attorney, Agent, or Firm—Connolly and Hutz

[57] ABSTRACT

A very active catalyst system for olefin polymerization is composed of an aluminoxane and a metallocene of the formula I

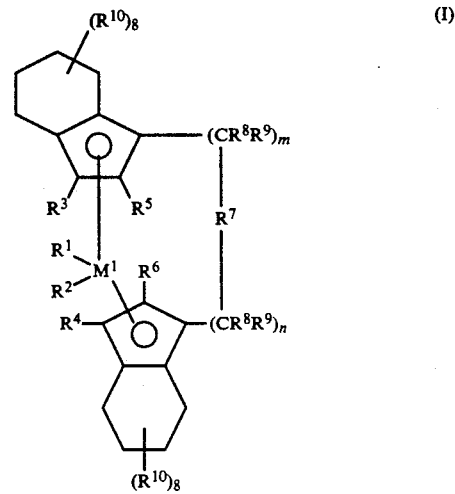

in which, preferably, $M^1$ is Zr or Hf, $R^1$ and $R^2$ are alkyl or halogen, $R^3$ and $R^4$ are hydrogen, $R^5$ and $R^6$ are alkyl or haloalkyl, $-(CR^8R^9)_m-R^7-(CR^8R^9)_n-$ is a single-membered or multimembered chain in which $R^7$ may furthermore be a (substituted) hetero atom, $m+n$ is zero or 1 and $R^{10}$ is hydrogen. The catalyst system gives polymers having high stereospecificity and a high melting point.

13 Claims, No Drawings

PROCESS FOR THE PREPARATION OF A SYNDIOTACTIC POLYOLEFIN

This application is a continuation of application Ser. No. 07/789,733 filed on Nov. 8, 1991.

DESCRIPTION

The invention relates to a process for the preparation of olefin polymers having a narrow molecular weight distribution and high isotacticity.

The literature discloses soluble metallocene compounds based on bis(cyclopentadienyl)zirconium alkyl or halide in combination with oligomeric aluminoxanes. With these systems it is possible to polymerize ethylene and propylene with moderate activity, but isotactic polypropylene is not obtained. The polypropylenes prepared in this manner are amorphous and therefore have no defined melting point.

Furthermore, it is known that the catalyst system bis(cyclopentadienyl)titaniumdiphenyl/methylaluminoxane is capable of converting propylene into stereo block polymers, i.e. polypropylene having longer or shorter isotactic sequences (cf. U.S. Pat. No. 4,522,982). Substantial disadvantages of this catalyst system are the fact that the polymerization temperatures (0° C. to −60° C.) are irrelevant on a large industrial scale, the completely unsatisfactory catalyst activities and the excessively low melting points of the polypropylene products compared with polypropylene prepared industrially using heterogeneous catalyst systems based on $MgCl_2/TiCl_4$ catalysts.

Isotactic polypropylene can be prepared with the aid of ethylenebis(4,5,6,7-tetrahydro-1-indenyl)zirconium dichloride together with an aluminoxane in a suspension polymerization (cf. EP-A 185 918). The polymer has a narrow molecular weight distribution, which is advantageous for certain applications, for example for high performance injection molding.

In addition to a number of other deficiencies, such as excessively low metallocene activities or poor product morphology, the melting points of these polypropylenes too are too low, i.e. their crystallinity and hence their hardness are still too low for use of the polymer as a structural material.

A special method for preactivating the metallocene with an aluminoxane was also proposed and leads to a considerable increase in the activity of the catalyst system and to a substantial improvement in the particle morphology of the polymer (cf. DE 37 26 067).

However, a decisive improvement in the melting points, crystallinities and hardnesses of the polymers thus prepared cannot be achieved in this manner.

However, these properties are very important with regard to the use of polymers as structural materials (for example large hollow articles, pipes, moldings).

It is an object to find a process and a catalyst which, having high activity, permits the preparation of polymers having a narrow molecular weight dispersity, high stereospecificity and a higher melting point and hence higher crystallinity and greater hardness.

It has been found that this object can be achieved using bridged metallocene systems substituted in a certain manner in the ligand sphere.

The invention thus relates to a process for the preparation of an olefin polymer by polymerization or copolymerization of an olefin of the formula $R^a$—CH=CH—$R^b$, in which $R^a$ and $R^b$ are identical or different and are a hydrogen atom or a hydrocarbon radical having 1 to 14 carbon atoms, or $R^a$ and $R^b$, together with the atoms binding them, may form a ring, at a temperature of −60° to 200° C., at a pressure of from 0.5 to 100 bar, in solution, in suspension or in the gas phase, in the presence of a catalyst which is composed of a metallocene as a transition metal compound and an aluminoxane of the formula (II)

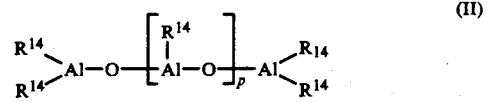

for the linear type and/or of the formula III

for the cyclic type, where, in the formulae (II) and (III), the radicals $R^{14}$ may be identical or different and are a $C_1$–$C_6$-alkyl group, a $C_6$–$C_{18}$-aryl group or hydrogen and p is an integer of from 2 to 50, wherein the metallocene is a compound of the formula I

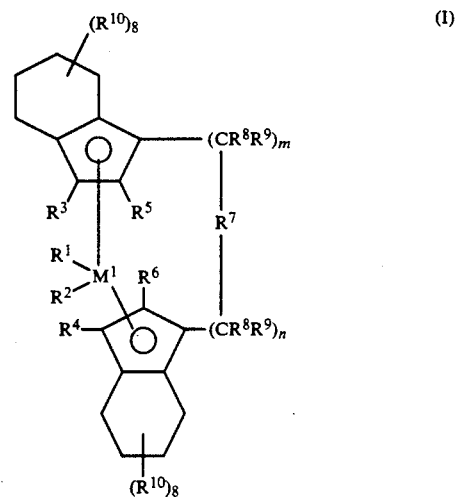

in which
$M^1$ is a metal of group IVb, Vb or VIb of the Periodic Table,
$R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom,
$R^3$ and $R^4$ are identical or different and are a hydrogen atom, a halogen atom, a $C_1$–$C_{10}$-alkyl group which may be halogenated, a $C_6$–$C_{10}$-aryl group, a —$NR_2^{15}$, —$SR^{15}$, —$OSiR_3^{15}$, —$SiR_3^{15}$ or —$PR_2^{15}$ radical, in which $R^{15}$ is a halogen atom, a $C_1$–$C_{10}$-alkyl group or a $C_6$–$C_{10}$-aryl group,
$R^5$ and $R^6$ are identical or different and have the meaning stated for $R^3$ and $R^4$, with the proviso that $R^5$ and $R^6$ are not hydrogen, $R^7$ is -continued

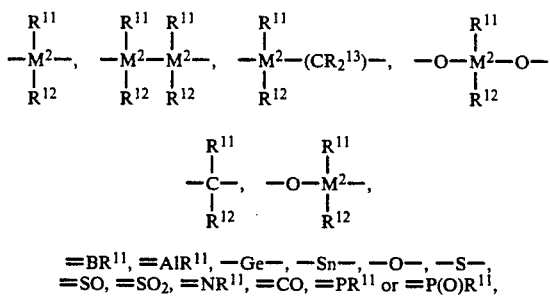

$=BR^{11}$, $=AlR^{11}$, $-Ge-$, $-Sn-$, $-O-$, $-S-$,
$=SO$, $=SO_2$, $=NR^{11}$, $=CO$, $=PR^{11}$ or $=P(O)R^{11}$, where $R^{11}$, $R^{12}$ and $R^{13}$ are identical or different and are a hydrogen atom, a halogen atom, a $C_1$-$C_{10}$-alkyl group, a $C_1$-$C_{10}$-fluoroalkyl group, a $C_6$-$C_{10}$-aryl group, a $C_6$-$C_{10}$-fluoroaryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or $R^{11}$ and $R^{12}$ or $R^{11}$ and $R^{13}$, together with the atoms binding them, each form a ring, $M^2$ is silicon, germanium or tin, $R^8$ and $R^9$ are identical or different and have the meaning stated for $R^{11}$, m and n are identical or different and are zero, 1 or 2, m plus n being zero, 1 or 2, and the radicals $R^{10}$ are identical or different and have the meaning stated for $R^{11}$, $R^{12}$ and $R^{13}$.

Alkyl is straight-chain or branched alkyl. Halogen (halogenated) is fluorine, chlorine, bromine or iodine, preferably fluorine or chlorine.

The present invention furthermore relates to the polyolefins prepared by the process described.

The catalyst to be used for the process according to the invention is composed of an aluminoxane and a metallocene of the formula I

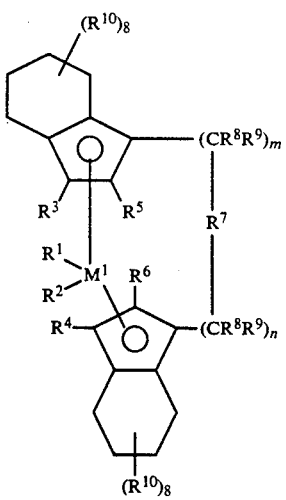

In the formula I, $M^1$ is a metal of group IVb, Vb or VIb of the Periodic Table, for example titanium, zirconium, hafnium, vanadium, niobium, tantalum, chromium, molybdenum and tungsten, preferably zirconium, hafnium and titanium.

$R^1$ and $R^2$ are identical or different and are a hydrogen atom, $C_1$-$C_{10}$-alkyl group, preferably a $C_1$-$C_3$-alkyl group, a $C_1$-$C_{10}$-alkoxy group, preferably a $C_1$-$C_3$-alkoxy group, a $C_6$-$C_1$-aryl group, preferably a $C_6$-$C_8$-aryl group, a $C_6$-$C_{10}$-aryloxy group, preferably a $C_6$-$C_8$-aryloxy group, a $C_2$-$C_{10}$-alkenyl group, preferably a $C_2$-$C_4$-alkenyl group, a $C_7$-$C_{40}$-arylalkyl group, preferably a $C_7$-$C_{10}$-arylalkyl group, a $C_7$-$C_{40}$-alkylaryl group, preferably a $C_7$-$C_{12}$-alkylaryl group, a $C_8$-$C_{40}$-arylalkenyl group, preferably a $C_8$-$C_{12}$-arylalkenyl group, or a halogen atom, preferably chlorine.

$R^3$ and $R^4$ are identical or different and are a hydrogen atom, a halogen atom, preferably a fluorine, chlorine or bromine atom, a $C_1$-$C_{10}$-alkyl group, preferably a $C_1$-$C_4$-alkyl group, which may be halogenated, a $C_6$-$C_{10}$-aryl group, preferably a $C_6$-$C_8$-aryl group, a $-NR_2^{15}$, $-SR^{15}$, $-OSiR_3^{15}$, $-SiR_3^{15}$ or $-PR_2^{15}$ radical, wherein $R^{15}$ is a halogen atom, preferably a chlorine atom, or a $C_6$-$C_{10}$-alkyl group, preferably a $C_6$-$C_8$-alkyl group, or a $C_6$-$C_{10}$-aryl group, preferably a $C_6$-$C_8$-aryl group. $R^3$ and $R^4$ are particularly preferably hydrogen.

$R^5$ and $R^6$ are identical or different, preferably identical, and have the meanings described for $R^3$ and $R^4$, with the proviso that $R^5$ and $R^6$ may not be hydrogen. $R^5$ and $R^6$ are preferably ($C_1$-$C_4$)-alkyl which may be halogenated, such as methyl, ethyl, propyl, isopropyl, butyl, isobutyl or trifluoromethyl, in particular methyl.

$R^7$ is 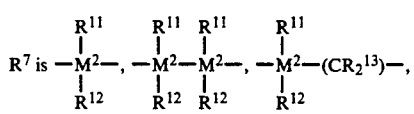

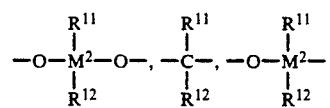

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$, in which $R^{11}$, $R^{12}$ and $R^{13}$ are identical or different and are a hydrogen atom, a halogen atom, a $C_1$-$C_{10}$-alkyl group, preferably a $C_1$-$C_4$-alkyl group, in particular a methyl group, a $C_1$-$C_{10}$-fluoroalkyl group, preferably a $CF_3$ group $C_6$-$C_{10}$-aryl group, preferably a $C_6$-$C_8$-aryl group, a $C_6$-$C_{10}$-fluoroaryl group, preferably a pentafluorophenyl group, a $C_1$-$C_{10}$-alkoxy group, preferably a $C_1$-$C_4$-alkoxy group, in particular a methoxy group, a $C_2$-$C_{10}$-alkenyl group, preferably a $C_2$-$C_4$-alkenyl group, a $C_7$-$C_{40}$-arylalkyl group, preferably a $C_7$-$C_{10}$-arylalkyl group, a $C_8$-$C_{40}$-arylalkenyl group, preferably a $C_8$-$C_{12}$-arylalkenyl group, or a $C_7$-$C_{40}$-alkylaryl group, preferably a $C_7$-$C_{12}$-alkylaryl group, or $R^{11}$ and $R^{12}$ or $R^{11}$ and $R^{13}$, together with the atoms binding them, each form a ring.

$M^2$ is silicon, germanium or tin, preferably silicon or germanium.

$R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ are identical or different and have the meanings stated for $R^{11}$.

m and n are identical or different and are zero, 1 or 2, preferably zero or 1, m plus n being zero, 1 or 2, preferably zero or 1.

The radicals $R^{10}$ are identical or different and have the meanings stated for $R^{11}$, $R^{12}$ and $R^{13}$. The radicals $R^{10}$ are preferably hydrogen atoms or a $C_1$-$C_{10}$-alkyl group, preferably a $C_1$-$C_4$-alkyl group.

Thus, the particularly preferred metallocenes are the compounds of the formulae A, B, and C

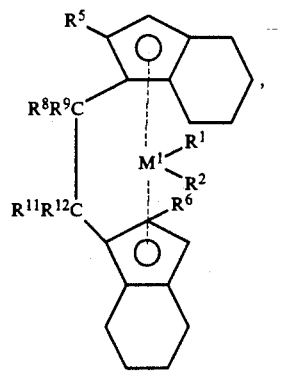
(A)

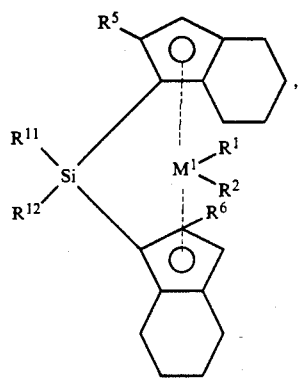
(B)

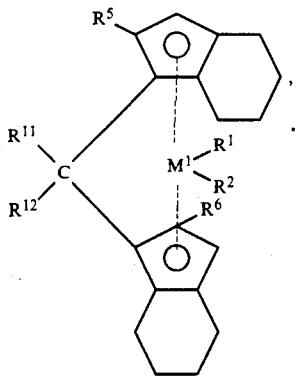
(C)

in which
M$^1$ is Zr or Hf, R$^1$ and R$^2$ are methyl or chlorine, R$^5$ and R$^6$ are methyl, ethyl or trifluoromethyl and R$^8$, R$^9$, R$^{11}$ and R$^{12}$ have the abovementioned meanings, in particular the compounds I mentioned in the Illustrative Examples.

The chiral metallocenes are used as a racemate for the preparation of highly isotactic poly-1-olefins. However, it is also possible to use the pure R or S form. An optically active polymer can be prepared with these pure stereoisomeric forms. However, the meso form of the metallocenes should be isolated since the center (the metal atom) which is active with regard to polymerization in these compounds is no longer chiral owing to mirror symmetry at the central metal and therefore cannot produce a highly isotactic polymer.

The separation of the stereoisomers is known in principle.

The metallocenes described above can be prepared, for example, according to the following reaction scheme:

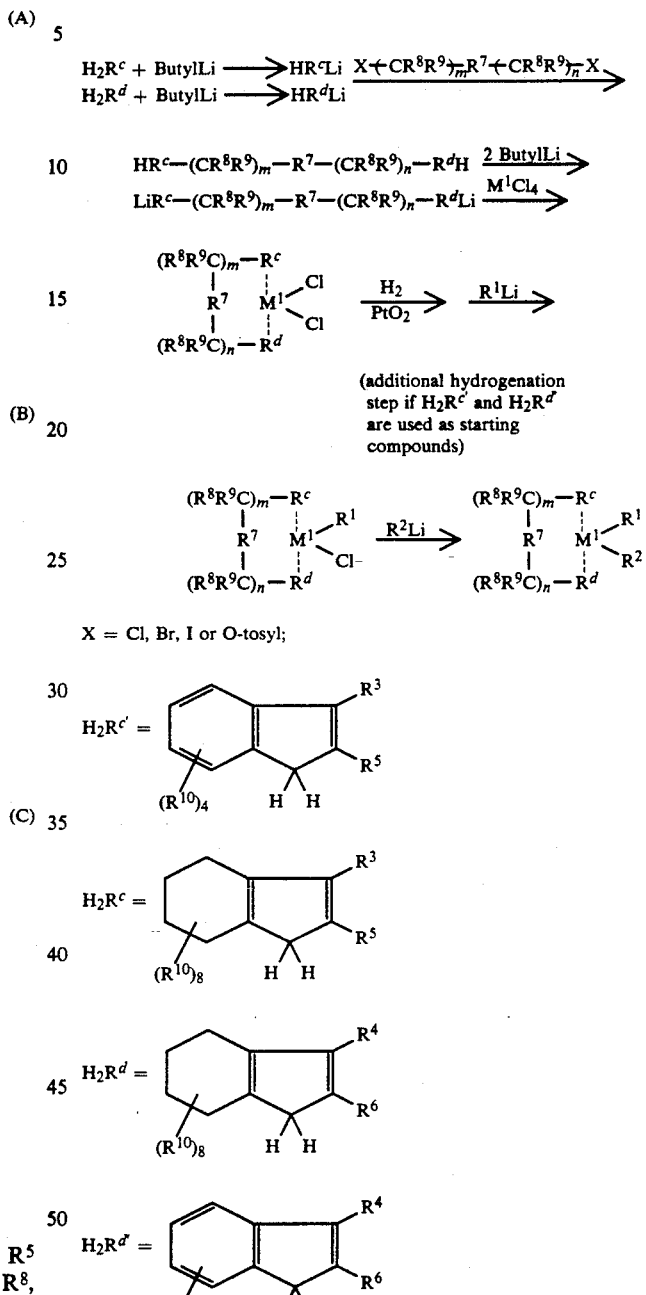

(additional hydrogenation step if H$_2$R$^c$ and H$_2$R$^d$ are used as starting compounds)

The preparation processes are known from the literature; cf. Journal of Organometallic Chem. 288 (1985) 63–67, EP-A 320 762 and the Illustrative Examples.

According to the invention, the cocatalyst used is an aluminoxane of the formula (II)

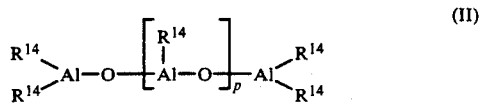
(II)

for the linear type and/or of the formula (III)

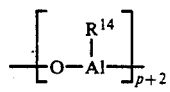

(III)

for the cyclic type, where, in the formulae (II) and (III), the radicals $R^{14}$ may be identical or different and are a $C_1$-$C_6$-alkyl group, a $C_6$-$C_{18}$-aryl group or hydrogen and p is an integer from 2 to 50, preferably from 10 to 35.

Preferably, the radicals $R^{14}$ are identical and are methyl, isobutyl, phenyl or benzyl, particularly preferably methyl.

If the radicals $R^{14}$ are different, they are preferably methyl and hydrogen or alternatively methyl and isobutyl, hydrogen or isobutyl preferably being present in an amount of 0.01-40% (number of radicals $R^{14}$).

The aluminoxane can be prepared in various ways by known processes. One of the methods, for example, is to react an aluminum-hydrocarbon compound and/or a hydridoaluminum-hydrocarbon compound with water (gaseous, solid, liquid or bound - for example as water of crystallization) in an inert solvent (such as, for example, toluene). For the preparation of an aluminoxane having different alkyl groups $R^{14}$, two different aluminumtrialkyls ($AlR_3 + AlR'_3$), according to the desired composition, are reacted with water (cf. S. Pasynkiewicz, Polyhedron 9 (1990) 429 and EP-A 302 424).

The exact structure of the aluminoxanes II and III is not known.

Regardless of the method of preparation, the common feature of all aluminoxane solutions is a changing content of unconverted aluminum starting compound, which is present in free form or as adduct.

It is possible to preactivate the metallocene with an aluminoxane of the formula (II) and/or (III) prior to use in the polymerization reaction. This substantially increases the polymerization activity and improves the particle morphology.

The preactivation of the transition metal compound is carried out in solution. The metallocene is preferably dissolved in a solution of the aluminoxane in an inert hydrocarbon. A suitable inert hydrocarbon is an aliphatic or aromatic hydrocarbon. Toluene is preferably used.

The concentration of the aluminoxane in the solution is in the range from about 1% by weight to the saturation limit, preferably from 5 to 30% by weight, based in each case on the total solution. The metallocene can be used in the same concentration, but it is preferably employed in an amount of $10^{-4}$-1 mol per mole of aluminoxane. The preactivation time is 5 minutes to 60 hours, preferably from 5 to 60 minutes. A temperature of $-78°$ C. to 100° C., preferably 0° to 70° C., is employed.

The metallocene can also be prepolymerized or applied to a carrier. The olefin used in the polymerization, or one of the olefins used in the polymerization, is preferably employed for the prepolymerization.

Suitable carriers are, for example, silica gels, aluminas, solid aluminoxane or other inorganic carriers. Another suitable carrier is a polyolefin powder in finely divided form.

In a further possible embodiment of the process according to the invention, a salt-like compound of the formula $R_xNH_{4-x}BR'_4$ or of the formula $R_3PHBR'_4$ is used as the cocatalyst instead of or in addition to an aluminoxane. In the formulae, x is 1, 2 or 3, the radicals R are identical or different and are alkyl or aryl and R' is aryl which may also be fluorinated or partially fluorinated. In this case, the catalyst is composed of the reaction product of a metallocene with one of the stated compounds (cf. EP-A 277 004 and the Preparation Examples E and F). To remove catalyst poisons present in the propylene, purification with an aluminumalkyl, for example $AlMe_3$ or $AlEt_3$, is advantageous. This purification can be carried out in the polymerization system itself, or the propylene is brought into contact with the Al compound before being added to the polymerization system and is then separated off again.

The polymerization or copolymerization is carried out in a known manner in solution, in suspension or in the gas phase, continuously or batchwise, in one or more stages at a temperature of $-60°$ to 200° C., preferably 30° to 80° C. Olefins of the formula $R^a$—CH=CH—$R^b$ are polymerized or copolymerized. In this formula, $R^a$ and $R^b$ are identical or different and are a hydrogen atom or an alkyl radical having 1 to 14 carbon atoms.

However, $R^a$ and $R^b$, together with the carbon atoms binding them, may also form a ring. Examples of such olefins are ethylene, propylene, 1-butene, 1-hexene, 4-methyl-1-pentene, 1-octene, norbornene or norbornadiene. In particular, propylene and ethylene are polymerized.

If required, hydrogen is added as a molecular weight regulator. The total pressure in the polymerization system is 0.5 to 100 bar. Polymerization in the industrially particularly interesting pressure range of from 5 to 64 bar is preferred.

The metallocene is used in a concentration, based on the transition metal, of $10^{-3}$ to $10^{-8}$, preferably $10^{-4}$ to $10^{-7}$, mol of transition metal per $dm^3$ of solvent or per $dm^3$ of reactor volume. The aluminoxane is used in a concentration of $10^{-5}$ to $10^{-1}$ mol, preferably $10^{-4}$ to $10^{-2}$ mol, per $dm^3$ of solvent or per $dm^3$ of reactor volume. In principle, however, higher concentrations are also possible.

If the polymerization is carried out as a suspension or solution polymerization, an inert solvent usually used for the Ziegler low pressure process is employed. For example, the reaction is carried out in an aliphatic or cycloaliphatic hydrocarbon; for example, butane, pentane, hexane, heptane, isooctane, cyclohexane and methylcyclohexane may be mentioned as examples of such hydrocarbons.

A gasoline fraction or hydrogenated diesel oil fraction may also be used. Toluene is also suitable. Polymerization is preferably carried out in the liquid monomer.

If inert solvents are used, the monomers are metered in as a gas or liquid.

The polymerization can be carried out for any desired time, since the catalyst system to be used according to the invention shows only a slight time-dependent decrease of polymerization activity.

The process according to the invention is distinguished by the fact that, in the industrially interesting temperature range between 30° and 80° C., the metallocenes according to the invention produce polymers having a high molecular weight, high stereospecificity, a narrow molecular weight dispersity and in particular a high melting point, and hence high crystallinity and great hardness.

The Examples which follow are intended to illustrate the invention in more detail.

VN is the viscosity number in cm³/g
$M_w$ is the weight average molecular weight
$M_w/M_n$ is the molecular weight dispersity
} Determined by gel permeation chromatography II is the isotactic index (II = mm + ½mr), determined by ¹³C-NMR spectroscopy
$n_{iso}$ is the length of the isotactic blocks (in propylene units) ($n_{iso}$ = 1 + 2 mm/mr), determined by ¹³C-NMR spectroscopy Melting points and heats of fusion $\Delta H_{m.p.}$ were determined by DSC (20° C./min heating/cooling rate).

The melt flow index (MFI, 230° C., 5 kg load) was measured according to DIN 53,735 and expressed in g/10 min.

Synthesis of the metallocenes used in the Examples:

The preparation of the chelate ligands LiR$^c$—(CR$^8$R$^9$)$_m$—R$^7$—(CR$^8$R$^9$)$_n$—R$^d$Li by deprotonation is known and is carried out according to:

J. Am. Chem. Soc., 112 (1990) 2030-2031, ibid. 110 (1988) 6255-6256, ibid. 109 (1987), 6544-6545, J. Organomet. Chem., 322 (1987) 65-70, New. J. Chem. 14 (1990) 499-503, Bull. Soc. Chim., 1967, 2954.

The starting indenyl compounds H$_2$R$^c$ and H$_2$R$^d$ or H$_2$R$^{c'}$ and H$_2$R$^{d'}$ are prepared similarly to or by means of known synthesis methods:

J. Org. Chem., 49 (1984), 4226-4237, J. Chem. Soc., Perkin II, 1981, 403-408, J. Am. Chem. Soc., 106 (1984) 6702, J. Am. Chem. Soc., 65 (1943) 567, J. Med. Chem., 30 (1987) 1303-1308, Chem. Ber. 85 (1952) 78-85 and the Illustrative Examples.

Synthesis of the Starting Substances

I) Synthesis of 2-Me-indene 110.45 g (0.836 mol) of 2-indanone were dissolved in 500 ml of diethyl ether, and 290 cm³ of 3N (0.87 mol) of ethereal methyl-Grignard solution were added dropwise in such a way that gentle refluxing occurred. After boiling for 2 hours with gentle refluxing, the mixture was added to an ice/hydrochloric acid mixture and adjusted to a pH of 2-3 with ammonium chloride. The organic phase was separated off, washed with NaHCO$_3$ and sodium chloride solution and dried. 98 g of crude product (2-hydroxy-2-methylindane) were obtained, which was not further purified.

This product was dissolved in 500 cm³ of toluene and the solution was heated with 3 g of p-toluenesulfonic acid under a water separator until elimination of water had ended, the mixture was evaporated down, the residue was taken up in dichloromethane and the solution was filtered over silica gel and the filtrate distilled in vacuo (80° C./10 mbar).

Yield: 28.49 g (0.22 mol-26%).

The synthesis of this compound is also described in: C. F. Koelsch, P. R. Johnson, J. Am. Chem. Soc., 65 (1943) 567-573.

II) Synthesis of (2-Me-indene)$_2$SiMe$_2$ 13 g (100 mmol) of 2-Me-indene were dissolved in 400 cm³ of diethyl ether, 62.5 cm³ of 1.6N (100 mmol) n-butyl-lithium/n-hexane solution were added dropwise in the course of 1 hour, while cooling with ice, and stirring was then continued for 1 hour at −35° C.

6.1 cm³ (50 mmol) of dimethyldichlorosilane in 50 cm³ of Et$_2$O were initially taken, the lithio salt solution was added dropwise at 0° C. in the course of 5 hours and the mixture was stirred overnight at room temperature and allowed to stand over the weekend.

The solid which had settled out was filtered off and the filtrate was evaporated to dryness. After extraction with small portions of n-hexane, filtration was carried out and the filtrate evaporated down. 5.7 g (18.00 mmol) of white crystals were obtained. The mother liquor was evaporated down and then purified by column chromatography (n-hexane/H$_2$CCl$_2$ 9:1 parts by volume), 2.5 g (7.9 mmol-52%) of product being obtained (as an isomer mixture).

$r_F$ (SiO$_2$; n-hexane/H$_2$CCl$_2$ 9:1 parts by volume)=0.37

The ¹H-NMR spectrum shows the signals to be expected for an isomer mixture, in shift and integration ratio.

III) Synthesis of (2-Me-ind)$_2$CH$_2$CH$_2$ 3 g (23 mmol) of 2-Me-indene were dissolved in 50 cm³ of THF, 14.4 cm³ of 1.6N (23.04 mmol) n-butyllithium/n-hexane solution were added dropwise and stirring was then carried out for 1 hour at 65° C. Thereafter, 1 cm³ (11.5 mmol) of 1,2-dibromoethane was added at −78° C. and the mixture was allowed to warm up to room temperature and stirred for 5 hours. After being evaporated down, the mixture was purified by column chromatography (SiO$_2$; n-hexane/H$_2$CCl$_2$ 9:1 parts by volume).

The product-containing fractions were combined and evaporated down, the residue was taken up in dry ether, the solution was dried over MgSO$_4$ and filtered and the solvent was stripped off.

Yield: 1.6 g (5.59 mmol-49%) of an isomer mixture $r_F$ (SiO$_2$; n-hexane/H$_2$CCl$_2$ 9:1 parts by volume)=0.46

The ¹H-NMR spectrum meets the expectation for an isomer mixture in signal shift and integration.

A) Synthesis of rac-dimethylsilyl(2-Me-4,5,6,7-tetrahydro-1-indenyl)-2zirconium dichloride a. Synthesis of the precursor rac-dimethylsilyl(2-Me-1-indenyl)$_2$zirconium dichloride 1.68 g (5.31 mmol) of the chelate ligand dimethylsilyl(2-methylindene)$_2$ were added to 50 cm³ of THF, and 663 cm³ of a 1.6N (10.61 mmol) n-BuLi/n-hexane solution were added dropwise. The addition was carried out at ambient temperature in the course of 0.5 hour. Stirring was carried out for 2 hours at about 35° C., after which the solvent was stripped off in vacuo and the residue was stirred with n-pentane, filtered off and dried.

The dilithio salt thus obtained was added to a suspension of 1.24 g (5.32 mmol) of ZrCl$_4$ in 50 cm³ of CH$_2$Cl$_2$ and the mixture was stirred for 3 hours at this temperature. After warming up to room temperature overnight, the mixture was evaporated down. The ¹H-NMR spectrum indicated a rac/meso mixture in addition to the presence of a little ZrCl$_4$(thf)$_2$. After stirring with n-pentane and drying, the solid, yellow residue was suspended in THF, filtered off and investigated by NMR spectroscopy. These three operations were repeated several times; finally, 0.35 g (0.73 mmol-14%) of the product was obtained in which, according to ¹H-NMR, the rac form was concentrated to more than 17:1.

The compound gave a correct elemental analysis and the following NMR signals (CDCl$_3$, 100 MHz): δ=1.25 (s, 6H, Si-Me); 2.18 (s, 6H, 2-Me), 6.8 (s, 2H, 3-H-Ind); 6.92-7.75 (m, 8H, 4-7-H-Ind).

b. Synthesis of the End Product 0.56 g (1.17 mmol) of the precursor rac-dimethylsilyl(2-Me-1-indenyl)$_2$zirconium dichloride was dissolved in 70 cm$^3$ of CH$_2$Cl$_2$ and the solution was introduced, together with 40 mg of PtO$_2$, into a 200 cm$^3$ NOVA stirred autoclave. Stirring was then carried out for 4 hours at room temperature under an H$_2$ pressure of 40 bar. The filtrate was evaporated down, leached with toluene/n-hexane (1:2 parts by volume) and filtered, and the filtrate was evaporated down. After the addition of n-pentane, the resulting suspension was filtered and the residue dried. The yield was 0.34 g (0.7 mmol-60%). The $^1$H-NMR spectrum (CD$_2$Cl$_2$, 100 MHz) gave the following signals: $\delta$=0.90 (s, 6H, Me-Si); 1.43–1.93 (m, 8H, indenyl-H); 2.10 (s, 6H, 2-Me); 2.44–3.37 (m, 8H, indenyl-H); 6.05 (s, 2H, 3-H-Ind).

B) Synthesis of rac-ethylene(2-Me-4,5,6,7-tetrahydro-1-indenyl)$_2$zirconium dichloride a. Synthesis of the precursor rac-ethylene(2-Me-1-indenyl)$_2$zirconium dichloride 14.2 cm$^3$ of 2.5N (35.4 mmol) n-BuLi/n-hexane solution were added dropwise to 5.07 g (17.7 mmol) of the ligand ethylene(2-methylindene)$_2$ in 200 cm$^3$ of THF at room temperature in the course of 1 hour and stirring was then carried out for 3 hours at about 50° C. A precipitate which is formed in the meantime goes into solution again. The mixture was allowed to stand overnight. 6.68 g (17.7 mmol) of ZrCl$_2$(thf)$_2$ in 250 cm$^3$ of THF were added dropwise, simultaneously with the above dilithio salt solution, to about 50 cm$^3$ of THF at 50° C., and the mixture was then stirred for 20 hours at this temperature. The toluene extract of the evaporation residue was evaporated down. After extraction of the residue with a little THF, recrystallization was effected from toluene. 0.44 g (0.99 mmol-5.6%) of product was obtained, the rac form being concentrated to more than 15:1.

The compound gave a correct elemental analysis and the following NMR signals (CDCl$_3$, 100 MHz): $\delta$=2.08 (2s, 6H, 2-Me); 3.45–4.18 (m, 4H, —CH$_2$CH$_2$—), 6.65 (2H, 3-H-Ind); 7.05–7.85 (m, 8H, 4–7-H-Ind).

b. Synthesis of the End Product 0.56 g (1.25 mmol) of rac-ethylene(2-Me-1-indenyl)$_2$zirconium dichloride was dissolved in 50 cm$^3$ of CH$_2$Cl$_2$ and the solution was introduced, together with 40 mg of PtO$_2$, into a 200 cm$^3$ NOVA stirred autoclave. Stirring was then carried out for 2 hours at room temperature under an H$_2$ pressure of 40 bar. The mixture was evaporated to dryness and the residue was sublimed in a high vacuum at a bath temperature of about 100° C. 0.46 g (1.01 mmol-81%) of product was obtained. The elemental analysis was correct and the $^1$H-NMR spectrum shows the following signals: $\delta$=1.46–1.92 (m, 8H, Indenyl-H), 2.14 (s, 6H, 2-Me); 2.49–2.73 (m, 6H, Indenyl-H and —CH$_2$CH$_2$—), 2.89–3.49 (m, 6H, Indenyl-H); 6.06 (s, 2H, 3-H-Ind).

C) Synthesis of rac-dimethylsilyl(2-Me-4,5,6,7-tetrahydro-1-indenyl)-2zirconiumdimethyl 0.27 g (0.56 mmol) of rac-dimethylsilyl(2-Me-4,5,6,7-tetrahydro-1-indenyl)$_2$zirconium dichloride was dissolved in 20 cm$^3$ of Et$_2$O, the solution was cooled to −50° C. and 1.1 cm$^3$ of a 1.6N (1.76 mmol) ethereal MeLi solution were added dropwise. Stirring was then carried out for 1 hour at 0° C. and, after the solvent had been exchanged for n-pentane, stirring was carried out for 0.5 hour at room temperature. The filtered evaporation residue was sublimed in a high vacuum. 0.21 g (0.47 mmol-83%) of a product which gave a correct elemental analysis was obtained.

D) Synthesis of rac-ethylene(2-Me-4,5,6,7-tetrahydro-1-indenyl)$_2$zirconiumdimethyl 0.18 g (0.40 mmol) of rac-ethylene(2-Me-4,5,6,7-tetrahydro-1-indenyl)$_2$zirconium dichloride are dissolved in 20 cm$^3$ of Et$_2$O, the solution was cooled to −50° C. and 1 cm$^3$ of a 1.6N (1.6 mmol) ethereal MeLi solution is added dropwise. The mixture was stirred for two hours at 0° C., and after the solvent had been exchanged for n-hexane stirring was carried out for 0.5 hour at ambient temperature. Filtration and evaporation were followed by sublimation. 0.13 g (0.31 mmol-79%) of product giving the correct elemental analysis was obtained.

E) Reaction of rac-dimethylsilyl(2-Me-4,5,6,7-tetrahydro-1-indenyl)-2zirconiumdimethyl with [Me$_2$NHPh][B(C$_6$F$_5$)$_4$]

0.15 g (0.33 mmol) of rac-dimethylsilyl(2-Me-4,5,6,7-tetrahydro-1-indenyl)$_2$zirconiumdimethyl was added to 0.25 g (0.31 mmol) of [Me$_2$NHPh][B(C$_6$F$_5$)$_4$] in 30 cm$^3$ of toluene. After being stirred for one hour at room temperature, the solution, which was then intensely colored, was evaporated down and the residue was extracted with a small amount of n-pentane and then dried in vacuo.

An aliquot part of the reaction mixture was used for the polymerization.

F) Reaction of rac-ethylene(2-Me-4,5,6,7-tetrahydro-1-indenyl)$_2$zirconiumdimethyl with [Bu$_3$NH][B(C$_6$H$_5$)$_4$]

0.12 g (0.29 mmol) of rac-ethylene(2-Me-4,5,6,7-tetrahydro-1-indenyl)$_2$zirconiumdimethyl was added to 0.14 g (0.28 mmol) of [Bu$_3$NH][B(C$_6$H$_5$)$_4$] in 20 cm$^3$ of toluene. Stirring was carried out for 1.5 hours at room temperature, and the now deeply colored reaction mixture was evaporated down and extracted with n-pentane, and the slightly oily residue was dried.

An aliquot part of the reaction mixture was used for the polymerization.

EXAMPLE 1

A dry 24 dm$^3$ reactor was flushed with nitrogen and filled with 12 dm$^3$ of liquid propylene.

35 cm$^3$ of a solution of methylaluminoxane in toluene (corresponding to 52 mmol of Al, mean degree of oligomerization n=17) were then added, and the batch was stirred for 15 minutes at 30° C. At the same time, 5.3 mg (0.011 mmol) of rac-dimethylsilyl(2-Me-4,5,6,7-tetrahydro-1-indenyl)$_2$zirconium dichloride were dissolved in 13.5 cm$^3$ of a solution of methylaluminoxane in toluene (20 mmol of Al) and were preactivated by allowing the solution to stand for 15 minutes. The solution was then introduced into the reactor and the polymerization system was brought to 70° C. (in the course of 5 minutes) by heating and was kept at this temperature for 3 hours by cooling. The activity of the metallocene was 50.3 kg of PP per g of metallocene per h.

$VN=37$ cm$^3$/g; $M_w=24,300$ g/mol; $M_w/M_n=2.4$; $II=96.0\%$; $n_{iso}=62$; m.p.$=150°$ C.; $\Delta H_{m.p.}=104$ J/g.

EXAMPLE 2

Example 1 was repeated, except that 19.5 mg (0.04 mmol) of the metallocene were used and the polymerization temperature was 50° C. The activity of the metallocene was 18.8 kg of PP per g of metallocene per h.

$VN=72$ cm$^3$/g; $M_w=64,750$ g/mol; $M_w/M_n=2.1$; $II=96.0\%$; $n_{iso}=64$; m.p.$=154°$ C.; $\Delta H_{m.p.}=109.5$ J/g.

EXAMPLE 3

Example 1 was repeated, except that 58.0 mg (0.12 mmol) of the metallocene were used and the polymerization temperature was 30° C. The activity of the metallocene was 9.7 kg of PP per g of metallocene per h.

$VN=152$ cm$^3$/g; $M_w=171,000$ g/mol; $M_w/M_n=2.2$; $II=99.9\%$; $n_{iso}=>500$; m.p.$=160°$ C.; $\Delta H_{m.p.}=103$ J/g.

Comparative Examples A–H

Examples 1 to 3 were repeated, except that the the metallocenes dimethylsilyl(2-Me-1-indenyl)$_2$zirconium dichloride (metallocene 1), dimethylsilyl(4,5,6,7-tetrahydro-1-indenyl)$_2$zirconium dichloride (metallocene 2) and dimethylsilyl(1-indenyl)$_2$zirconium dichloride (metallocene 3) were used.

| Comparative Example | Metallocene | Polym. temp. [°C.] | $n_{iso}$ | m.p. [°C.] | $\Delta H_{m.p.}$ [J/g] |
|---|---|---|---|---|---|
| A | 1 | 70 | 38 | 145 | 86.6 |
| B | 1 | 50 | 48 | 148 | 88.1 |
| C | 1 | 30 | 48 | 152 | 90.2 |
| D | 2 | 70 | 34 | 141 | — |
| E | 2 | 50 | 38 | 143 | — |
| F | 3 | 70 | 32 | 140 | — |
| G | 3 | 50 | 34 | 142 | — |
| H | 3 | 30 | 37 | 145 | — |

Comparison of the Comparative Examples F/G with D/E demonstrates the positive effect of the 4,5,6,7-tetrahydroindenyl ligand compared with indenyl, and Comparative Examples F/G/H compared with A/B/C show the positive effect of substitution in the 2-position of the indenyl ligand.

However, comparison with Examples 1 to 3 shows that only the combination of substitution in the 2-position with the tetrahydroindenyl system leads to very high melting points and heats of fusion and hence to high crystallinity and hardness of the polymers.

EXAMPLE 4

Example 1 was repeated, except that 6.8 mg (0.015 mmol) of ethylene(2-Me-4,5,6,7-tetrahydro-1-indenyl)$_2$zirconium dichloride were used.

The metallocene activity was 72.5 kg of PP per g of metallocene per h.

$VN=35$ cm$^3$/g; $M_w=20,750$ g/mol; $M_w/M_n=1.9$; $II=94.5\%$; $n_{iso}=34$; m.p.$=141°$ C.; $\Delta H_{m.p.}=92.4$ J/g.

EXAMPLE 5

Example 4 was repeated, except that 28.1 mg (0.062 mmol) of the metallocene were used and the polymerization temperature was 50° C. The metallocene activity was 28.5 kg of PP per g of metallocene per h.

$VN=51$ cm$^3$/g; $M_w=28,200$ g/mol; $M_w/M_n=2.2$; $II=94.8\%$; $n_{iso}=35$; m.p.$=143°$ C.; $\Delta H_{m.p.}=97.9$ J/g.

EXAMPLE 6

Example 4 was repeated, except that 50 mg (0.110 mmol) of the metallocene were used and the polymerization temperature was 30° C. The metallocene activity was 10.9 kg of PP per g of metallocene per h.

$VN=92$ cm$^3$/g; $M_w=93,800$ g/mol; $M_w/M_n=2.2$; $II=95.5\%$; $n_{iso}=48$; m.p.$=151°$ C.; $\Delta H_{m.p.}=99.0$ J/g.

COMPARATIVE EXAMPLES I–O

Examples 4 to 6 were repeated, but the metallocenes used were ethylene(1-indenyl)$_2$zirconiumdichloride (metallocene 4) and ethylene(2-Me-1-indenyl)$_2$zirconium dichloride (metallocene 5).

| Comparative Example | Metallocene | Polym. temp. [°C.] | $n_{iso}$ | m.p. [°C.] | $\Delta H_{m.p.}$ [J/g] |
|---|---|---|---|---|---|
| I | 4 | 70 | 23 | 132 | 64.9 |
| K | 4 | 50 | 30 | 138 | 78.1 |
| L | 4 | 30 | 29 | 137 | 78.6 |
| M | 5 | 70 | 25 | 134 | 77.0 |
| N | 5 | 50 | 30 | 138 | 78.9 |
| O | 5 | 30 | 32 | 138 | 78.6 |

Comparison of Comparative Examples I to O with Examples 4 to 6 demonstrates the effect of substitution in the 2-position in conjunction with the use of the tetrahydroindenyl system. $n_{iso}$, the melting point and the heat of fusion are each substantially higher in Examples 4–6 -thus, the crystallinity and the hardness of the polymers are also substantially improved.

EXAMPLE 7

Example 2 was repeated, except that 15.0 mg (0.034 mmol) of rac-dimethylsilyl(2-Me-4,5,6,7-tetrahydro-1-indenyl)$_2$zirconiumdimethyl were used as the metallocene. The activity of the metallocene was 21.9 kg of PP per g of metallocene per h.

$VN=75$ cm$^3$/g; $M_w=69,500$ g/mol; $M_w/M_n=2.2$; $II=96.3\%$;

$n_{iso}=66$; m.p.$=156°$ C.; $\Delta H_{m.p.}=107$ J/g.

EXAMPLE 8

Example 2 was repeated, except that 20.9 mg (0.05 mmol) of rac-ethylene(2-Me-4,5,6,7-tetrahydro-1-indenyl)$_2$-zirconiumdimethyl were used as the metallocene. The activity of the metallocene was 30.9 kg of PP per g of metallocene per h.

$VN=50$ cm$^3$/g; $M_w=30,500$ g/mol; $M_w/M_n=2.1$; $II=95.0\%$; $n_{iso}=36$; m.p.$=144°$ C.; $\Delta H_{m.p.}=98.5$ J/g.

EXAMPLE 9

A dry 16 dm$^3$ reactor was flushed with nitrogen. 1.6 dm$^3$ (corresponding to 0.1 bar) of hydrogen and finally 10 dm$^3$ of liquid propylene and 29.2 cm$^3$ of a solution of methylaluminoxane in toluene (corresponding to 40 mmol of Al, mean degree of oligomerization 17) were then metered in and were stirred for 10 minutes at 30° C. At the same time, 17.0 mg (0.035 mmol) of rac-dimethylsilyl(2-Me-4,5,6,7-tetrahydro-1-indenyl)$_2$zirconium dichloride were dissolved in 11.2 cm$^3$ of a solution of methylaluminoxane in toluene (20 mmol of Al) and the solution was introduced into the reactor after 10 minutes. Polymerization was carried out at 30° C. for 3 hours. The metallocene activity was 12.0 kg of PP per g of metallocene per h.

VN=110 cm$^3$/g; M$_w$=119,800 g/mol; M$_w$/M$_n$=2.0; II=99.8%; n$_{iso}$= >500; m.p.=162° C.; ΔH$_{m.p.}$=110.8 J/g.

EXAMPLE 10

The procedure was carried out as in Example 9, except that 25.0 mg (0.055 mmol) of rac-ethylene(2-Me-4,5,6,7-tetrahydro-1-indenyl)$_2$zirconium dichloride were used. The metallocene activity was 12.5 kg of PP per g of metallocene per h.

VN=66 cm$^3$/g; M$_w$=62,400 g/mol; M$_w$/M$_n$=2.2; II=96.7%;

n$_{iso}$=60; m.p.=153° C.; ΔH$_{m.p.}$=104.7 J/g.

EXAMPLE 11

A dry 24 dm$^3$ reactor was flushed with nitrogen and filled with 12 dm$^3$ of liquid propylene with 4.0 cm$^3$ of a solution of methylaluminoxane in toluene (corresponding to 6 mmol of Al, mean degree of oligomerization 17), and stirring was carried out for 15 minutes at 30° C.

6 cm$^3$ of the toluene-containing reaction mixture of racdimethylsilyl(2-Me-4,5,6,7-tetrahydro-1-indenyl)-2zirconiumdimethyl and [Me$_2$NHPh][B(C$_6$F$_5$)$_4$], which was described in the metallocene synthesis in Section E) (corresponding to 30 mg (0.068 mmol) of metallocene), were then metered into the vessel. Polymerization was carried out for 2 hours at 50° C. The metallocene activity was 15.9 kg of PP per g of metallocene per h.

VN=76 cm$^3$/g; M$_w$=70,900 g/mol; M$_w$/M$_n$=2.3; II=96.1%; n$_{iso}$=65; m.p.=155° C.; ΔH$_{m.p.}$=104.4 J/g.

EXAMPLE 12

The procedure was as described in Example 11, except that 5 cm$^3$ of the toluene-containing reaction mixture of racethylene(2-Me-4,5,6,7-tetrahydro-1-indenyl)-2zirconiumdimethyl and [Bu$_3$NH][B(C$_6$H$_5$)4], which was described in the metallocene synthesis in Section F) (corresponding to 30 mg (0.073 mmol) of metallocene), were used. The metallocene activity was 24.0 kg of PP per g of metallocene per h.

VN=50 cm$^3$/g; M$_w$=30,100 g/mol; M$_w$/M$_n$=2.2; II=95.0%;

n$_{iso}$=37; m.p.=142° C.; ΔH$_{m.p.}$=97.0 J/g.

EXAMPLE 1

Example 11 was repeated, except that a solution of trimethylaluminum in toluene (8 mmol of Al) was used instead of the methylaluminoxane solution. The metallocene activity was 14.0 kg of PP per g of metallocene per h.

VN=96 cm$^3$/g; M$_w$=64,100 g/mol; M$_w$/M$_n$=2.2; II=96.0%;

n$_{iso}$=64; m.p.=154° C.; ΔH$_{m.p.}$=107.3 J/g.

EXAMPLE 14

Example 13 was repeated, except that no trimethylaluminum was used in the polymerization.

The propylene used was purified with triethylaluminum (1 mmol of AlEt$_3$/dm$^3$ of propylene) before addition to the polymerization system, and the reaction products and AlEt$_3$ were separated off by distillation. The metallocene activity was 15.0 kg of PP per g of metallocene per h.

VN=70 cm$^3$/g; M$_w$=65,000 g/mol; M$_w$/M$_n$=2.2; II=96.0%; n$_{iso}$=64; m.p.=155° C.; ΔH$_{m.p.}$=106.0 J/g.

EXAMPLE 15

A dry 16 dm$^3$ reactor was flushed with nitrogen and filled at 20° C. with 10 dm$^3$ of a gasoline cut from which aromatics had been removed and which had a boiling range of 100°–120° C.

The gas space of the vessel was then flushed nitrogen-free by forcing in 2 bar of ethylene and letting down the pressure, these operations being carried out 5 times. 30 cm$^3$ of a solution of methylaluminoxane in toluene (corresponding to 45 mmol of Al, molecular weight according to cryoscopic determination 750 g/mol) were then added.

The reactor content was then heated to 60° C. in the course of 15 minutes while stirring, and the total pressure was adjusted to 5 bar by adding ethylene, at a stirring speed of 250 rpm.

At the same time, 4.7 mg (0.01 mmol) of rac-ethylene(2-Me-4,5,6,7-tetrahydro-1-indenyl)$_2$zirconium dichloride were dissolved in 20 cm$^3$ of a solution of methylaluminoxane in toluene and were preactivated by allowing the solution to stand for 15 minutes. The solution was then introduced into the reactor, and the polymerization system was brought to a temperature of 70° C. and kept at this temperature for 1 hour by appropriate cooling. The total pressure was kept at 5 bar during this time by appropriate feeding of ethylene.

550 g of polyethylene were obtained, corresponding to a metallocene activity of 117.0 kg of PE per g of metallocene per h. The viscosity number was 491 cm$^3$/g.

EXAMPLE 16

Example 3 was repeated, except that the aluminoxane used was isobutylmethylaluminoxane in the same Al concentration and amount. Isobutylmethylaluminoxane was obtained by reacting a mixture of isobutylAlMe$_2$ and AlMe$_3$ with water in heptane (9 mol % of isobutyl units and 91 mol % of Me units). The activity was 9.2 kg of PP per g of metallocene per h and the melting point of the polymer was 159° C.

EXAMPLE 17

Example 3 was repeated, except that the aluminoxane used was hydridomethylaluminoxane in the same Al concentration and amount. Hydridomethylaluminoxane was obtained by reacting Me$_2$AlH with water in toluene (contained 12 mol % of H units and 88 mol % of Me units). The activity was 6.2 kg of PP per g of metallocene per h and the melting point of the polymer was 158° C.

EXAMPLE 18

A dry 70 dm$^3$ reactor was flushed with nitrogen and propylene and filled with 40 dm$^3$ of liquid propylene. 180 cm$^3$ of a solution of methylaluminoxane in toluene (corresponding to 270 mmol of aluminoxane, mean degree of oligomerization p=17) were then added and the batch was stirred for 15 minutes at 30° C. 50 g of ethylene were then metered in. At the same time, 10.6 mg (0.02 mmol) of rac-dimethylsilyl(2-methyl-4,5,6,7-tetrahydro-1-indenyl)$_2$zirconium dichloride were dissolved in 20 cm$^3$ of a solution of methylaluminoxane in toluene (30 mmol of Al) and were preactivated by allowing the solution to stand for 15 minutes. The solution was then introduced into the reactor and the latter was brought to the polymerization temperature of 60° C. in the course of 10 minutes. Polymerization was carried out for 4 hours and a further 100 g of ethylene were metered in continuously during this time. The polymerization was stopped with $CO_2$ gas, excess gaseous monomer was allowed to escape and the product was dried at 80° C. in a high vacuum. 2.25 kg of a random propylene/ethylene copolymer having an ethylene content of 6.2% by weight were obtained. $VN=82$ $cm^3/g$, $M_w=74,500$ g/mol, $M_w/M_n=2.2$, substantially isolated ethylene incorporation with a mean $C_2$ block length <1.2 ($^{13}C$—NMR).

EXAMPLE 19

Example 1 was repeated with a polymerization temperature of 65° C. but, after polymerization for 3 hours (stage 1), an additional 500 g of ethylene were added, distributed over a polymerization time of a further 3 hours (stage 2). The activity of the metallocene was 78.6 kg of $C_2/C_3$ block copolymer per g of metallocene per h. The copolymer contained 18.4% of ethylene. The extractable elastomeric phase content ($C_2/C_3$ rubber) was 60%. The product has a very good low-temperature impact strength ($a_{kv}$ according to DIN 53,453, injection molded specimens) at 23° C., 0° C. and −20° C.: no fracture, −40° C.: 62.0 mJ mm$^{-2}$. The ball indentation hardness (according to DIN 53,456, compression molded specimens, heated for 3 h at 140° C., 132N) was 36 Nmm$^{-2}$.

Abbreviations:

Me=methyl, Et=ethyl, Bu=butyl, Ph=phenyl, THF=tetrahydrofuran, PE=polyethylene, PP=polypropylene

We claim:

1. A process for the preparation of an essentially isotactic olefin polymer by polymerization or copolymerization of an olefin of the formula $R^a$—CH=CH—$R^b$, in which $R^a$ and $R^b$ are identical or different and are a hydrogen atom or a hydrocarbon radical having 1 to 14 carbon atoms, or $R^a$ and $R^b$, together with the atoms binding them, may form a ring, at a temperature of −60° to 200° C., at a pressure of 0.5 to 100 bar, in solution, in suspension or in the gas phase, in the presence of a catalyst which is composed of a metallocene as a transition metal compound and an aluminoxane of the formula (II)

$$R^{14}_{\phantom{14}}\!\!\diagdown_{Al-O} \left[ \begin{array}{c} R^{14} \\ | \\ Al-O \end{array} \right]_p Al \diagup^{R^{14}}_{R^{14}} \quad (II)$$

for the linear type or of the formula III $$\left[ \begin{array}{c} R^{14} \\ | \\ Al-O \end{array} \right]_{p+2} \quad (III)$$

for the cyclic type, where, in the formulae (II) and (III), the radicals $R^{14}$ may be identical or different and are a $C_1$-$C_6$-alkyl group, a $C_6$-$C_{18}$-aryl group or hydrogen and p is an integer of from 2 to 50, wherein the metallocene is a compound of the formula I

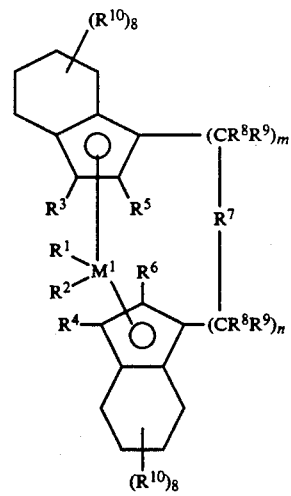

in which $M^1$ is a metal of group IVb, Vb or VIb of the Periodic Table, $R^1$ and $R^2$ are identical or different and are a hydrogen atom, a $C_1$-$C_{10}$-alkyl group, a $C_1$-$C_{10}$-alkoxy group, a $C_6$-$C_{10}$-aryl group, a $C_6$-$C_{10}$-aryloxy group, a $C_2$-$C_{10}$-alkenyl group, a $C_7$-$C_{40}$-arylalkyl group, a $C_7$-$C_{40}$-alkylaryl group, a $C_8$-$C_{40}$-arylalkenyl group or a halogen atom, $R^3$ and $R^4$ are identical or different and are a hydrogen atom, a halogen atom, a $C_1$-$C_{10}$-alkyl group which is optionally halogenated, a $C_6$-$C_{10}$-aryl group, a —$NR_2^{15}$, —$SR^{15}$, —$OSiR_3^{15}$, —$SiR_3^{15}$ or —$PR_2^{15}$ radical, in which $R^{15}$ is a halogen atom, a $C_1$-$C_{10}$-alkyl group or a $C_6$-$C_{10}$-aryl group, $R^5$ and $R^6$ are identical or different and have the meaning stated for $R^3$ and $R^4$, with the proviso that $R^5$ and $R^6$ are not hydrogen, $R^7$ is

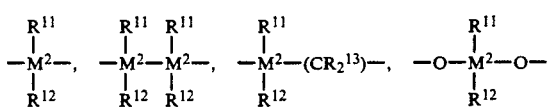

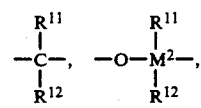

$=BR^{11}$, $=AlR^{11}$, —Ge—, —Sn—, —O—, —S—, $=SO$, $=SO_2$, $=NR^{11}$, $=CO$, $=PR^{11}$ or $=P(O)R^{11}$, where $R^{11}$, $R^{12}$ and $R^{13}$ are identical or different and are a hydrogen atom, a halogen atom, a $C_1$-$C_{10}$-alkyl group, a $C_1$-$C_{10}$-fluoroalkyl group, a $C_6$-$C_{10}$-aryl group, a $C_6$-$C_{10}$-fluoroaryl group, a $C_1$-$C_{10}$-alkoxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group, or $R^{11}$ and $R^{12}$ or $R^{11}$ and $R^{13}$, together with the atoms binding them, each form a ring, $M^2$ is silicon, germanium or tin, $R^8$ and $R^9$ are identical or different and have the meaning stated for $R^{11}$, m and n are identical or different and are zero, 1 or 2, m plus n being zero, 1 or 2, and the radicals $R^{10}$ are identical or different and have the meanings stated for $R^{11}$, $R^{12}$ and $R^{13}$.

2. The process as claimed in claim 1, wherein, in the formula I, $M^1$ is Zr or Hf, $R^1$ and $R^2$ are identical or different and are methyl or chlorine, $R^3$ and $R^4$ are hydrogen, $R^5$ and $R^6$ are identical or different and are methyl, ethyl or trifluoromethyl, $R^7$ is a radical

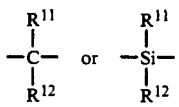

n plus m is zero or 1 and $R^{10}$ is hydrogen.

3. A process for the preparation of an olefin polymer, wherein the olefin is polymerized in the presence of a catalyst comprising a compound of formula I as claimed in claim 1.

4. The process as claimed in claim 3, wherein said catalyst comprises said compound of formula I and an aluminoxane.

5. The process as claimed in claim 3, wherein the olefin to be polymerized has the formula $R^a$—CH=CH—$R^b$, wherein $R^a$ and $R^b$ are identical or different and are a hydrogen atom or a hydrocarbon radical having 1 to 14 C atoms, or $R^a$ and $R^b$, together with the atoms binding them, can form a ring.

6. The process as claimed in claim 5, wherein the olefin is polymerized at temperature of $-60°$ to $200°$ C., at a pressure of 0.5 to 100 bar, in solution, in suspension or in the gas phase.

7. The process as claimed in claim 3, wherein, in said formula I, $M^1$ is Zr or Hf, $R^1$ and $R^2$ are identical or different and are methyl or chlorine, $R^3$ and $R^4$ are hydrogen, $R^5$ and $R^6$ are identical or different and are methyl, ethyl, or trifluoromethyl, $R^7$ is a radical

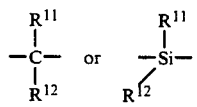

n plus m is zero or 1, and $R^{10}$ is hydrogen.

8. The process as claimed in claim 3, wherein, in said formula I, $R^{11}$, $R^{12}$ and $R^{13}$ are identical or different and are a hydrogen atom, a halogen atom, a $C_1$–$C_{14}$-alkyl group, a $CF_3$ group, a $C_6$–$C_8$-aryl group, a pentafluorophenyl group, a $C_1$–$C_4$-alkoxy group, a $C_2$–$C_4$-alkenyl group, a $C_7$–$C_{10}$-arylalkyl group, a $C_8$–$C_{12}$-arylalkenyl group or a $C_7$–$C_{12}$-alkylaryl group, or $R^{11}$ and $R^{12}$ or $R^{11}$ and $R^{13}$, in each case together with the atoms connecting them, form a ring.

9. The process as claimed in claim 8, wherein $R^8$ and $R^9$ and the radicals $R^{10}$ are identical or different and have the meanings stated for $R^{11}$, $R^{12}$, and $R^{13}$.

10. The process as claimed in claim 1, wherein $R^{11}$, $R^{12}$ and $R^{13}$ are identical or different and are a hydrogen atom, a halogen atom, a $C_1$–$C_4$-alkyl group, a $CF_3$ group, a $C_6$–$C_8$-aryl group, a pentafluorophenyl group, a $C_1$–$C_4$-alkoxy group, a $C_2$–$C_4$-alkenyl group, a $C_7$–$C_{10}$-arylalkyl group, a $C_8$–$C_{12}$-arylalkenyl group or a $C_7$–$C_{12}$-alkylaryl group, or $R^{11}$ and $R^{12}$ or $R^{11}$ and $R^{13}$, in each case together with the atoms connecting them, form a ring.

11. The process as claimed in claim 1, wherein $R^7$ is $=CR^{11}R^{12}$, $=SiR^{11}R^{12}$, $=GeR^{11}R^{12}$, —O—, —S—, $=SO$, $=PR^{11}$ or $=P(O)R^{11}$.

12. The process as claimed in claim 1, wherein m and n are identical or different and are zero or 1.

13. A process for the preparation of an olefin polymer by polymerization or copolymerization of an olefin of the formula $R^a$—CH=CH—$R^b$, in which $R^a$ and $R^b$ are identical or different and are a hydrogen atom or a hydrocarbon radical having 1 to 14 carbon atoms, or $R^a$ and $R^b$, together with the atoms binding them, may form a ring, at a temperature of $-60°$ to $200°$ C., at a pressure of 0.5 to 100 bar, in solution, in suspension or in the gas phase, in the presence of a catalyst which is composed of a metallocene as a transition metal compound and an aluminoxane of the formula (II)

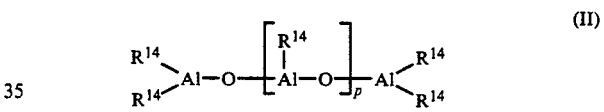

for the linear type or of the formula III

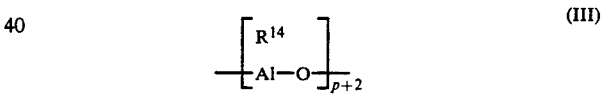

for the cyclic type, where, in the formulae (II) and (III), the radicals $R^{14}$ may be identical or different and are a $C_1$–$C_6$-alkyl group, a $C_6$–$C_{18}$-aryl group or hydrogen and p is an integer of from 2 to 50, wherein the metallocene is a compound selected from the group consisting of rac-dimethylsilyl(2-methyl-4,5,6,7-tetrahydro-1-indenyl)$_2$zirconium dichloride, racethylene(2-methyl-4,5,6,7-tetrahydro-1-indenyl)$_2$-zirconium dichloride, rac-dimethylsilyl(2-methyl-4,5,6,7-tetrahydro-1-indenyl)$_2$zirconiumdimethyl and rac-ethylenne(2-methyl-4,5,6,7-tetrahydro-1-indenyl)$_2$zirconiumdimethyl.

* * * * *

UNITED STATES PATENT AND TRADEMARK OFFICE
CERTIFICATE OF CORRECTION

PATENT NO. : 5,239,022
DATED : August 24, 1993
INVENTOR(S) : Andreas Winter et al It is certified that error appears in the above-indentified patent and that said Letters Patent is hereby corrected as shown below:

On title page, column 1, line 1:

Please amend the title to read: --PROCESS FOR THE PREPARATION OF AN OLEFIN POLYMER--.

Signed and Sealed this

Fifteenth Day of November, 1994

Attest:

BRUCE LEHMAN

*Attesting Officer*    *Commissioner of Patents and Trademarks*